No. 828,887. PATENTED AUG. 21, 1906.
W. T. HOOFNAGLE.
PROCESS OF MAKING CLEAR ICE.
APPLICATION FILED MAY 20, 1903.
3 SHEETS—SHEET 1.
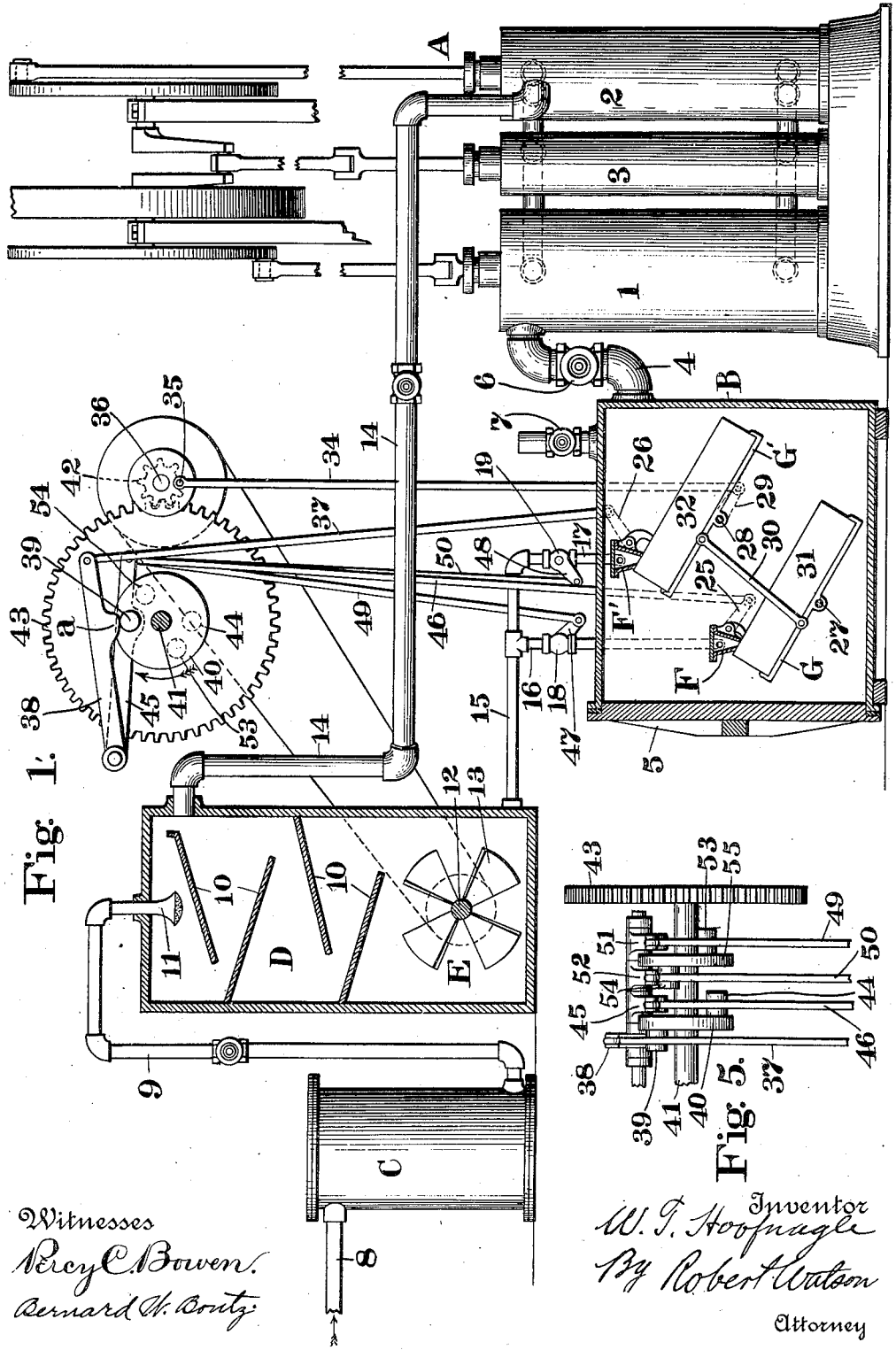
Witnesses
Percy C. Bowen.
Bernard W. Boutz.
Inventor
W. T. Hoofnagle
By Robert Watson
Attorney

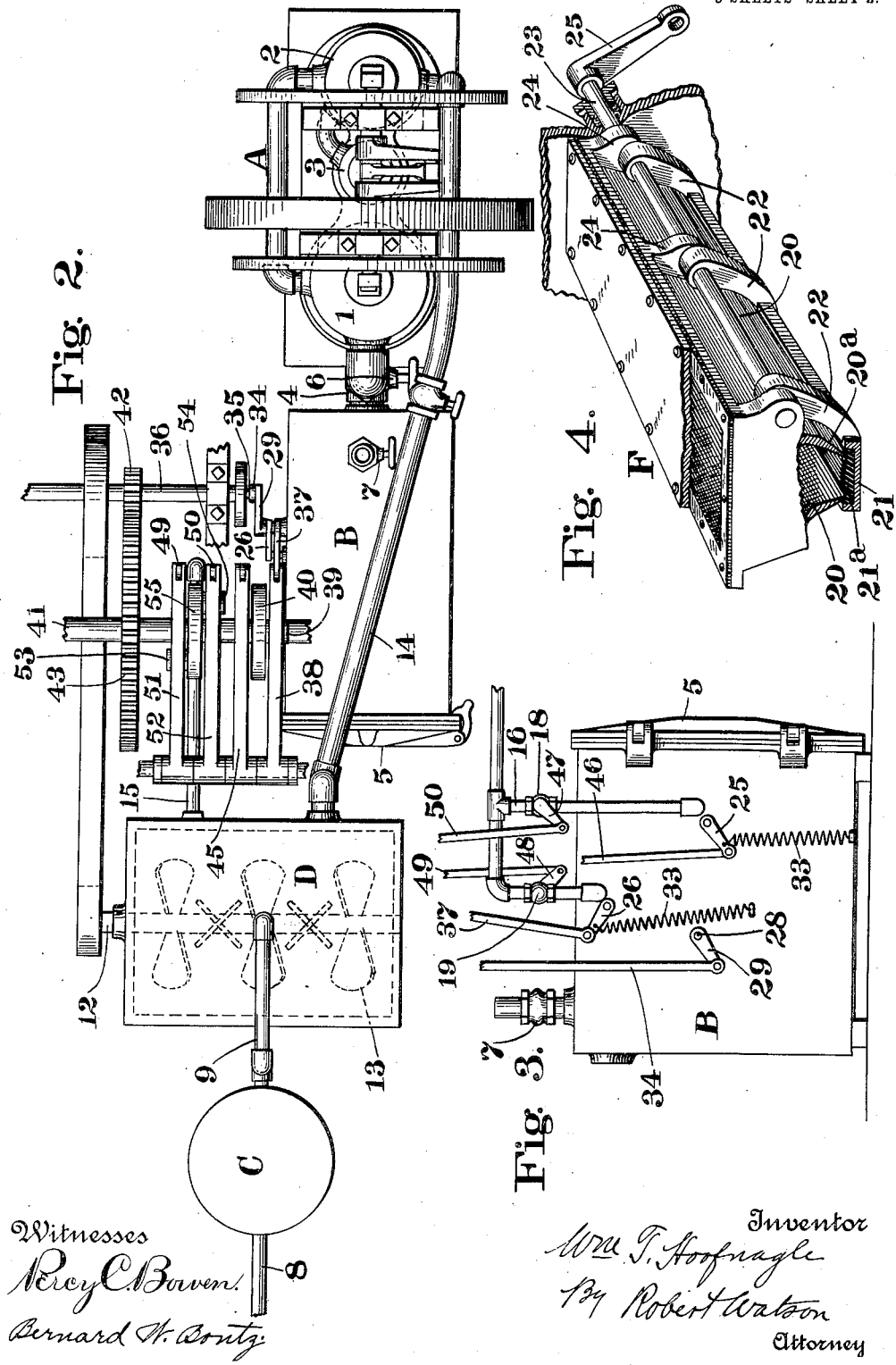

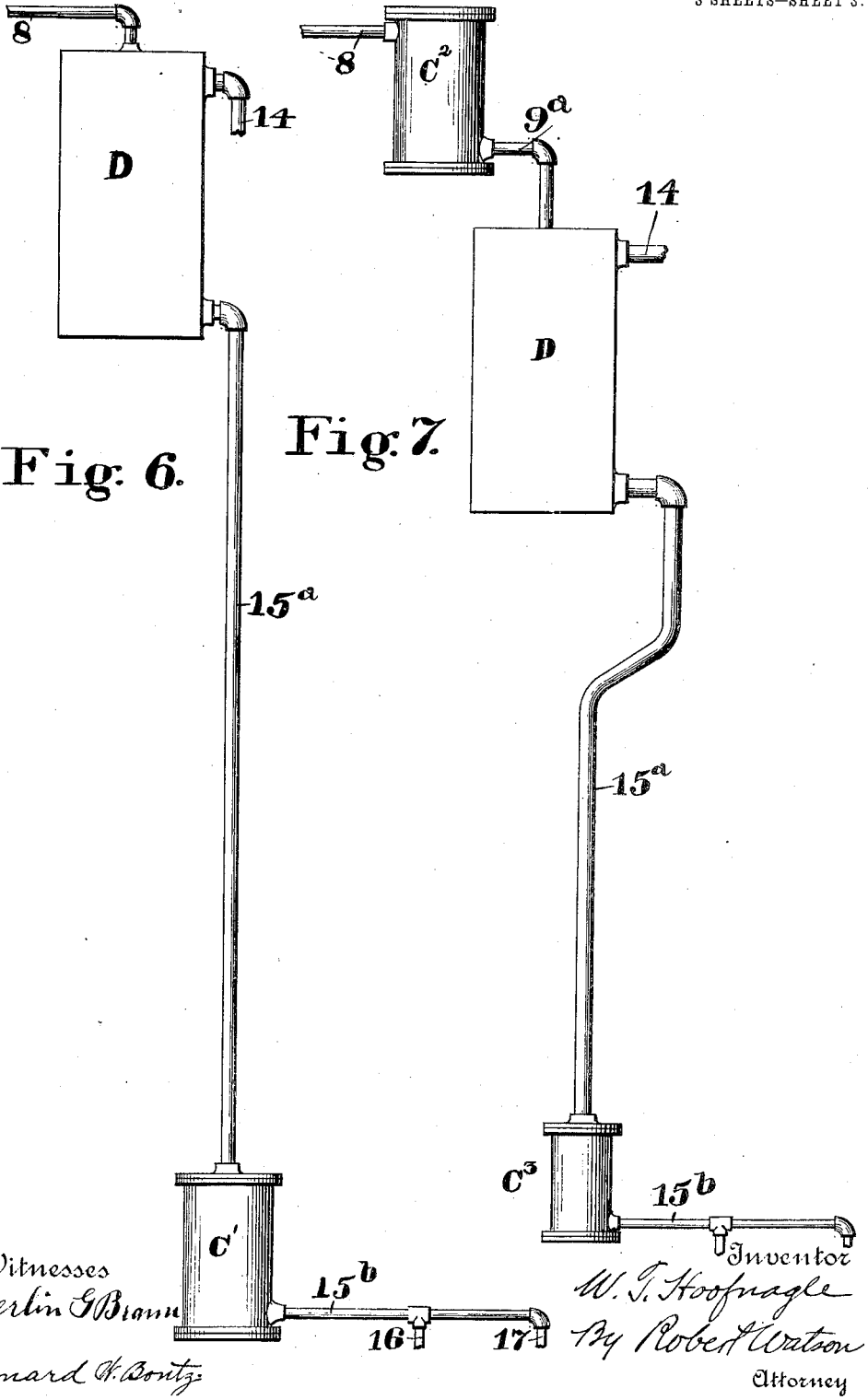

UNITED STATES PATENT OFFICE.

WILLIAM T. HOOFNAGLE, OF WHITESTONE, NEW YORK.

PROCESS OF MAKING CLEAR ICE.

No. 828,887.

Specification of Letters Patent.

Patented Aug. 21, 1906.

Application filed May 20, 1903. Serial No. 158,027.

*To all whom it may concern:*

Be it known that I, WILLIAM T. HOOFNAGLE, a citizen of the United States, residing at Whitestone, in the county of Queens and State of New York, have invented certain new and useful Improvements in Processes of Making Clear Ice, of which the following is a specification.

This invention relates to an improved method of manufacturing ice, in the practice of which clear ice in block form may be made by the vacuum process, in which the water is frozen by its own partial vaporization in a vacuum.

In carrying out my invention the water to be frozen after having first been properly filtered or otherwise clarified is introduced into a closed deaerating and cooling chamber, which is connected to suitable exhaust mechanism adapted to maintain a vacuum in the chamber sufficiently high to remove the greater part of the air from the water and cool the water by its own vaporization to a temperature near the freezing-point. The vacuum maintained in this chamber, however, is insufficient to cause the water to congeal. Suitable means are provided for spraying, spreading, and agitating the water while in this cooling and deaerating chamber, so that the entrained air and gases will readily leave the water and pass off with the vapors to the exhaust mechanism. After having been preliminarily deaerated as far as practicable and relieved of part of its heat in this chamber the water without again being brought in contact with the atmosphere and while still under less than atmospheric pressure is conveyed in regulated quantities into a freezing-chamber and delivered into one or more constantly-moving pans. This freezing-chamber is connected with suitable exhaust mechanism, and a high enough vacuum is maintained in the chamber to cause rapid evaporation and freezing of the water. The pans are moved in such manner as to flow the water back and forth therein, thus exposing the water in thin sheets to the influence of the high vacuum, so that any air remaining therein is readily freed and removed and the water is quickly frozen in thin successive layers. Cakes of clear ice are thus built up in the pans. As the water is preliminarily cooled and relieved of the greater part of its air before entering the freezing-chamber and then exposed in thin sheets in said chamber, the blocks of ice are quickly formed.

In order to explain my invention fully, I have illustrated in the accompanying drawings one form of apparatus suitable for manufacturing clear ice by my method. The essential and novel steps in the practice of my invention may, however, be carried out in various ways and by various means.

In the drawings, Figure 1 is a side view, partly in section, of an apparatus suitable for practicing my invention. Fig. 2 is a plan view of the same. Fig. 3 is a side view of the freezing-chamber, showing the connections for operating the valves to admit water to the pans or trays in which the ice is formed and also the connections for rocking the trays. Fig. 4 is a detailed perspective view, on an enlarged scale, of one of the water receivers or receptacles from which the water is admitted intermittently to the trays, one end of the receptacle being partly broken away; and Fig. 5 is a front view, looking from the right in Fig. 1, of the cam-levers, cams, and connections for operating the valves; and Figs. 6 and 7 are side views showing filters arranged between the aerating and freezing chambers.

Referring to the drawings, A indicates suitable exhaust mechanism, which in the drawings consists of a pump having low, intermediate, and high compression cylinders 1, 2, and 3, respectively, through which the vapors from a freezing-chamber B are successively and continuously drawn and ejected into the atmosphere or a suitable condenser during the ice-making process, the vapors passing from the freezing-chamber to the low-pressure cylinder 1 through a pipe connection 4. The freezing-chamber B is made air-tight and provided at one end with a door 5, through which access may be had to the interior of the chamber. A high vacuum is constantly maintained in the freezing-chamber B, and the water admitted to said chamber in the manner hereinafter described is frozen by its own partial rapid evaporation, the vapors therefrom being carried off by the pump. In order to remove the ice from the freezing-chamber, a valve 6 is provided in the pipe 4, by which communication between the pump and freezing-chamber may be cut off, and an air-inlet valve 7 is provided at a suitable place for admitting air to the chamber in order to break the vacuum and permit the door 5 to be opened.

The water to be frozen first passes from a supply-pipe 8 through a suitable filter C and thence by a pipe 9 to a deaerating and cooling chamber D. This chamber, as shown, is vertically arranged and provided with a series of reversely-inclined baffle or spreading plates 10, upon the uppermost one of which the water is delivered from the pipe 9 through a rose or spraying device 11, which sprays the water upon the plate. The water flows downwardly over the plates in a thin stream or layer and accumulates in the lower part of the chamber, wherein is arranged an agitating device E, consisting of a horizontally-arranged and suitably-driven shaft 12, having thereon a series of radially-arranged blades or beaters 13, which agitate the body of water in the bottom of the chamber. The upper portion of the deaerating and cooling chamber D is connected to the intermediate cylinder 2 of the pump by a suitable pipe 14, and a partial vacuum is thereby maintained in said chamber. As the chamber is connected to the intermediate cylinder of the pump, the vacuum is not sufficiently high to cause the water in the chamber D to congeal; but the vacuum is high enough to cause rapid evaporation of part of the water and cooling of the remainder to a temperature close to the freezing-point. This partial vacuum relieving the water of its atmospheric pressure permits the air contained in the water to escape therefrom and to pass out of the chamber with the vapors, and the spraying, spreading, and agitating of the water within the chamber permits the entrained air to pass freely from the water, thus leaving the latter in a practically deaerated condition when it leaves the chamber.

In order to take care of the vapors from the chamber D, the intermediate cylinder 2 of the pump which is connected to said chamber is made somewhat larger in diameter and capacity than it otherwise would be.

The water after having been deaerated and cooled down to a temperature near the freezing-point is admitted to the freezing-chamber B without being permitted to again come into contact with the atmosphere or to be subjected to atmospheric pressure. As shown, the deaerated and cooled water from the chamber D passes through a pipe 15 into branch pipes 16 and 17, in which are arranged automatically-operated valves 18 and 19, respectively. These branch pipes 16 and 17 lead through the walls of the vacuum or freezing chamber B into receivers or collectors F and F', respectively, secured transversely in the freezing-chamber. As shown in Fig. 4, each receiver consists of a trough made air-tight and having downwardly-converging sides 20, the lower edges of which are beveled to form knife-edges, as indicated by the numeral 20ª. The trough is closed at its lower side by a valve 21, which is secured by arms 22 to a shaft 23, which is journaled in suitable lugs or bearings 24 upon the side of the trough.

A facing 21ª, of rubber of other suitable material, is arranged upon the upper side of the valve, so that when the valve is closed a gas and water tight joint is formed between the valve and the knife-edges of the trough. The shafts 23, which operate the valves 21 of the receivers F and F', extend through suitable stuffing-boxes in the wall of the freezing-chamber, and crank-arms 25 and 26 are connected to the shafts of said receivers, respectively, externally to the freezing-chamber.

As shown in the drawings, two rocking trays G and G' are arranged centrally upon shafts 27 and 28, respectively, which are suitably supported in a horizontal position within the freezing-chamber. The shaft 28 extends through a suitable stuffing-box in the wall of the freezing-chamber and is provided at its outer end with a crank-arm 29. The trays are connected by a link 30, so that when the crank-arm is rocked the trays will rock in unison. These trays carry the removable pans 31 and 32, within which the blocks of ice are formed. The water receivers or collectors and the trays are so arranged that when the latter are tilted, as shown in Fig. 1, the receivers will be at the upper ends of the pans, and the trays are arranged so that they may rock about thirty degrees from the horizontal in both directions without interfering with the receivers. The trays are constantly rocked back and forth to permit the water delivered into the pans to freeze in successive films or layers.

The valves of the water-receptacles are normally held closed by springs 33, connected to the arms 25 and 26, and are opened periodically to permit the water contained in the receptacles to flow into the pans after the latter have made a stated number of oscillations, during which time the water delivered into the pans flows back and forth and is frozen in successive layers by reason of the rapid evaporation of a portion of the water. Each receptacle after having its contents discharged remains empty until shortly before its valve is again opened, when it is refilled with water from the deaerating and cooling chamber. The water, therefore, which is at a low temperature after leaving the deaerating-chamber does not enter the freezing-chamber until about the time it is to be emptied into the pans, and the formation of ice in the water-receptacles does not take place.

As shown in the drawings, the trays carrying the forming-pans are rocked by means of a rod 34, connected to the crank-arm 29 and to a crank-pin 35, carried by a constantly-rotated driving-shaft 36. The valve 21 of the water-receptacle F' is opened after the adjacent pan 32 has made six oscillations by means of a rod 37, connected to the crank-arm 26 and to the end of a cam-lever 38, which latter has a cam-surface a arranged in the path of a pin 39 upon a cam-wheel 40.

This cam-wheel is secured to a shaft 41, which is driven by a pinion 42 upon the driving-shaft 36 and a gear 43 upon the cam-shaft, the ratio of gearing shown in the drawings being one to six. The cam-wheel rotates in the direction indicated by the arrow, and the surface of the cam a is so formed that the pin 39 will raise the lever 38 promptly to open the valve and allow the water to pour into the pan in a solid stream the width of the pan without splashing when the pan is tilted into the position shown and permit the valve to be closed suddenly by the spring, so that any ice formed upon the valve-face or the narrow edges of the valve-seat will be cut off by the impact of the valve against the seat. In the same manner the valve of the receptacle F is opened once for every six oscillations of the pan 31 by a pin 44, arranged upon the opposite side of the cam-wheel 40 and diametrically opposite to the pin 39, a cam-lever 45 and a rod 46 connecting said cam-lever with the crank-arm 25. The receptacles for the different pans are opened alternately instead of simultaneously for the purpose of equalizing the evaporation work required of the pump and maintaining a more uniform vacuum.

The receptacles, as stated, are not refilled immediately after discharging their contents, the supply of water from the deaerating-chamber being normally cut off by the valves 18 and 19, arranged in the branch pipes 16 and 17. These cut-off valves 18 and 19 are opened immediately before the valves of the water-receptacles are opened by means of rods 49 and 50, connected to the valve-levers 47 and 48 and to cam-levers 51 and 52, respectively, which cam-levers are adapted to be raised and lowered alternately by pins 53 and 54 upon a cam-wheel 55, secured to the cam-shaft 41. These pins 53 and 54 are so arranged relatively to the pins 44 and 39 that the valves 18 and 19 will open and close to allow the receptacles to fill just before the valves of the receptacles are opened. The water, therefore, does not remain in the receptacles long enough to form ice.

A single pan or surface upon which the water may be made to flow back and forth is sufficient; but any number of pans or surfaces may be employed. Preferably two or more pans are used, and the water is discharged into them successively at intervals in order to keep the supply of water in the freezing-chamber as uniform as possible, so that the vacuum and the work required of the pump may be uniform. As the water is admitted from the deaerating and cooling chamber into the freezing-chamber without being in the meantime brought into contact with the atmosphere or subjected to atmospheric pressure and is cooled almost to the freezing-point before entering the freezing-chamber, the total work required of the pump is not in any way increased by the deaerating and cooling process. The clear ice may be made, therefore, with substantially the same expenditure of power as is required in making the vacuum ice, which is characterized by its whiteness, largely due to the entrained air.

The water-receptacles are nearly as wide as the interiors of the pans. They are filled with water intermittently, as stated, and when the valve of a receptacle is opened the water falls in a stream nearly or quite as wide as the interior of the pan and in such volume that it does not freeze in falling. Owing to the fact that the air is removed and the water is carried from one vacuum-chamber into another having a slightly higher vacuum without coming in contact with the atmosphere or being subject to atmospheric pressure in the meantime, there is no spraying of the water on entering the freezing-chamber such as would take place if the water were not deaerated or if it were forced into the chamber by atmospheric pressure. As the pan is tilted so that its upper end is adjacent to the receptacle at the moment when the water is poured into the pan, splashing is avoided, and the water flows to the opposite end of the pan in a thin sheet and is then rocked back and forth and is frozen in layers conforming to the dimensions of the pan, thus building up a solid block of clear ice of the same shape as the pan. As the water spreads out in a thin sheet of comparatively large area in the pan while being gently rocked back and forth, any air remaining in the water passes off with the vapors.

Ice formed by the vacuum process in the usual way by spraying the water into a vacuum-chamber is opaque, owing to the entrained air and to some extent to the irregular arrangement or formation of the ice-crystals, and the same difficulty has arisen in attempts to form ice in a vacuum from still water in cans. By my process the water is frozen in a state which is as compared with the spraying process comparatively quiet and dense, and as the water is preliminarily cooled to a low temperature and deaerated and then admitted to the pans intermittently in such quantities that it will pass into the pans in solid sheets or streams without freezing and is then rapidly frozen in layers no trouble is experienced from irregularity in ice-crystals or entrained air.

I find it advantageous to arrange the filter between the deaerating-chamber and the freezing-chamber, as shown in Figs. 6 and 7. In Fig. 6 the water from the source of supply is admitted directly to the deaerating-chamber D through the supply-pipe 8. After deaeration in this chamber the water flows by gravity through the pipe 15ª, filter C', and pipe 15$^b$ to the branch pipes 16 and 17, which lead to the water-receptacles in the freezing-chamber. The deaeration of the water causes a precipitate in the deaerating-chamber, which is removed by the filter C'. In Fig. 7 the arrangement is the same, except that a large filter C$^2$ is arranged to filter the water before entering the deaerating - chamber through the pipe 9$^a$, and a smaller filter C$^3$ is arranged between the pipes 15$^a$ and 15$^b$ to remove the precipitate which results from the deaeration of the water. With the arrangement shown in Figs. 6 and 7 it is unnecessary to use a coagulant, such as alum, to clarify the water. Where it is inconvenient to raise the deaerating-chamber high enough above the filter to obtain the necessary head to force the water through the filter, a pump may of course be inserted in the pipe 15$^a$ to supply sufficient force to pass the water through the filter.

Having described my invention, what I claim, and desire to secure by Letters Patent of the United States, is—

1. The method of manufacturing clear ice by the vacuum process, which comprises introducing the water to be frozen into a closed chamber, maintaining a partial vacuum therein to remove air from the water and preliminarily cool the water, transferring the water to another closed chamber intermittently in regulated quantities, flowing the water back and forth over a surface in said latter chamber, and maintaining a sufficiently high vacuum therein to freeze the water in successive layers by its own partial vaporization.

2. The method of manufacturing ice by the vacuum process, which comprises introducing the water to be frozen into a closed chamber, maintaining a partial vacuum therein to remove air from the water and preliminarily cool the water, transferring regulated quantities of the water intermittently, while under less than atmospheric pressure, to a surface or pan in a closed freezing-chamber in such volumes that the water will not freeze in passing onto said surface, flowing the water repeatedly over said surface, and maintaining a sufficiently high vacuum in said freezing-chamber to freeze the water by its own partial vaporization.

3. The method of manufacturing blocks of clear ice by the vacuum process which comprises preliminarily deaerating the water, pouring regulated quantities of the deaerated water intermittently upon a pan or surface in a freezing-chamber in such volumes that the water will not freeze in pouring it upon the surface, flowing the water repeatedly over said surface, and maintaining a sufficiently high vacuum in said freezing-chamber to freeze the water by its own partial vaporization.

4. The method of manufacturing blocks of clear ice by the vacuum process which comprises preliminarily deaerating the water, pouring regulated quantities of the deaerated water intermittently upon a surface or pan in a freezing-chamber in such volumes that the water will not freeze while passing onto said surface, flowing the water repeatedly over said surface and maintaining a sufficiently high vacuum in said freezing-chamber to freeze the water by its own partial vaporization.

5. The method of manufacturing blocks of clear ice by the vacuum process, which comprises preliminarily deaerating the water and reducing its temperature nearly to the freezing-point, pouring regulated quantities of the water, intermittently, upon a pan or surface in a freezing-chamber in such volumes that the water will not freeze in pouring it upon the pan or surface, moving said pan or surface to cause the water to flow repeatedly thereover, and maintaining a sufficiently high vacuum in said freezing-chamber to freeze the water by its own partial vaporization.

6. The method of manufacturing clear ice by the vacuum process which comprises admitting water to a pan or surface within a freezing-chamber intermittently, in such volumes that the water will not freeze while being admitted to the pan, maintaining a sufficiently high vacuum therein to freeze water by its own partial vaporization and rocking the pan constantly to cause the water to flow back and forth thereover whereby the water will be frozen in layers.

In testimony whereof I affix my signature in presence of two witnesses.

WILLIAM T. HOOFNAGLE.

Witnesses:
W. C. GERTSLER.
G. W. HOPKINS.